United States Patent
Lehtonen et al.

(10) Patent No.: US 7,516,038 B2
(45) Date of Patent: Apr. 7, 2009

(54) METHOD FOR THE MIRCOMECHANICAL MEASUREMENT OF ACCELERATION AND A MICROMECHANICAL ACCELERATION SENSOR

(75) Inventors: Tuomo Lehtonen, Vantaa (FI); Risto Mourujärvi, Perttula (FI); Teemu Salo, Klaukkala (FI); Jens Thurau, Selzen (DE)

(73) Assignee: VTI Technologies Oy, Vantaa (FI)

( * ) Notice: Subject to any disclaimer, the term of this patent is extended or adjusted under 35 U.S.C. 154(b) by 340 days.

(21) Appl. No.: 11/438,590

(22) Filed: May 23, 2006

(65) Prior Publication Data

US 2007/0062286 A1  Mar. 22, 2007

(30) Foreign Application Priority Data

Sep. 16, 2005  (FI) .................................. 20055497

(51) Int. Cl.
  *G01P 15/00* (2006.01)
(52) U.S. Cl. ...................................... 702/141
(58) Field of Classification Search .................. 702/141
  See application file for complete search history.

(56) References Cited

U.S. PATENT DOCUMENTS

| 5,103,667 | A | 4/1992 | Allen et al. |
| 5,905,203 | A | 5/1999 | Flach et al. |
| 6,023,664 | A | 2/2000 | Bennet |
| 6,535,800 | B2 * | 3/2003 | Wallner .................. 701/1 |
| 2003/0163282 | A1 | 8/2003 | Krieg et al. |
| 2005/0039530 | A1 | 2/2005 | Schellin et al. |

FOREIGN PATENT DOCUMENTS

| EP | 1462807 | 3/2004 |
| JP | 04-315058 | 11/1992 |
| WO | WO 00/29263 | 3/2000 |

OTHER PUBLICATIONS

International Search Report for International Appplication No. PCT/FI2006/050393, filed Sep. 15, 2006.

* cited by examiner

*Primary Examiner*—Tung S Lau
*Assistant Examiner*—Aditya S Bhat
(74) *Attorney, Agent, or Firm*—Squire, Sanders & Dempsey, LLP

(57) ABSTRACT

The invention relates to measurement devices used in the measurement of acceleration, and more specifically, to micromechanical acceleration sensors. The invention seeks to offer an improved method for the measurement of acceleration directed to three or two dimensions using a micromechanical acceleration sensor as well as an improved micromechanical acceleration sensor. Using this invention, the functional reliability of a sensor can be monitored in constant use, and it is suitable for use particularly in small-sized micromechanical acceleration sensor solutions measuring in relation to several axes.

15 Claims, 1 Drawing Sheet

METHOD FOR THE MIRCOMECHANICAL MEASUREMENT OF ACCELERATION AND A MICROMECHANICAL ACCELERATION SENSOR

FIELD OF THE INVENTION

The invention relates to measurement devices used in the measurement of acceleration, and more specifically, to micromechanical acceleration sensors. The invention seeks to offer an improved method for the micromechanical measurement of acceleration as well as an micromechanical acceleration sensor, which is suitable for use in small-sized micromechanical acceleration sensor solutions, and which is particularly suited for use in small-sized micromechanical acceleration sensor solutions measuring in relation to several axes.

BACKGROUND OF THE INVENTION

Measurement based on a micromechanical acceleration sensor has proven to be in principle a simple and reliable manner of measuring acceleration. In the case of a micromechanical acceleration sensor, measurement is based, for example, in the capacitance measurement on a change of a gap between two surfaces of a electrode pair of a sensor caused by acceleration. The capacitance between the surfaces, i.e. the storage capacity of the electrical charge, depends on the surface area of the surfaces and the distance between the surfaces. A measurement based on a micromechanical acceleration sensor such as a capacitance measurement can be used even with particularly small acceleration measurement areas.

Small-sized micromechanical acceleration sensors are often used in particularly critical application sites, such as, for example, in ABS and ESP systems (ABS, Antilocking Brake System; ESP, Electronic Stability Program) used in the automobile industry. For this reason, it is vitally important to assure the proper function of the capacitative acceleration sensors at start-up as well as in constant use. In demanding application sites there is a desire to know all deviations exceeding the device specifications in the functionality of the acceleration sensor after factory calibration. These types of deviations can be, among others, offset deviations, sensitivity deviations or physical damages.

Currently are known some micromechanical acceleration sensor solutions according to known art measuring in relation to several axes. For example, Finnish patent application publications FI 20030206 and FI 20030207 describe capacitative acceleration sensor solutions according to known art measuring in relation to several axes.

In acceleration sensor solutions according to known art, a disadvantage has been the observation of the functional reliability of the sensor at start-up as well as in constant use. In acceleration sensor solutions according to known art, a known self-testing arrangement can be used, in which the acceleration sensor is subjected to high voltage. The high voltage causes an electrostatic force between the measurement electrode and the mass of the sensor, resulting in bending of the spring and shifting of the mass, which changes the capacitance of the sensor, which can be measured using an ASIC (ASIC, Application Specific Integrated Circuit).

Using the self-testing arrangement described above offset deviations or sensitivity deviations due to time or temperature cannot be measured. Additionally, measurement of acceleration must be interrupted during self-testing.

In micromechanical acceleration sensor solutions according to known art and their self-testing methods, a disadvantage has also been the implementation of high voltage parts in the circuit structures used, which creates many disadvantages in the design and realization of circuit technology related to the acceleration sensor.

In demanding application sites of micromechanical acceleration sensors there is a clearly growing need for micromechanical acceleration sensors of greater functional reliability than earlier solutions, which are suitable for use in reliable measurement of acceleration particularly in small-sized micromechanical acceleration sensor solutions measuring in relation to several axes.

SUMMARY OF THE INVENTION

The object of the invention is an improved method for implementing continuous self-testing of a micromechanical acceleration sensor as well as an improved micromechanical acceleration sensor. Using this invention, the functional reliability of a micromechanical acceleration sensor can be monitored in constant use, and it is suitable for use particularly in small-sized micromechanical acceleration sensor solutions measuring in relation to several axes.

According to the first feature of the invention, a method is provided for the measurement of acceleration using the values of acceleration on the sensor measurement area, directed at the sensor, to the direction of three dimensions using a micromechanical acceleration sensor, which acceleration sensor comprises at least four units of sensor measurement devices measuring in different measurement directions, of which four vectors describing the measurement directions of the sensor measurement devices no three vectors belong to the same level such that in the method the continuous self-testing of the acceleration sensor during start-up and/or operation is implemented such that to the accelerations $\vec{a}_1, \vec{a}_2, \vec{a}_3, \ldots \vec{a}_n$ obtained as measurement results of the sensor measurement devices are given the multipliers $k_1, k_2, k_3, \ldots k_n$ such that, when the sensor is functioning perfectly, the value of the expression $k_1 \vec{a}_1 + k_2 \vec{a}_2 + k_3 \vec{a}_3 + \ldots + k_n \vec{a}_n$ calculates to $\vec{0}$, the accelerations $\vec{a}_1, \vec{a}_2, \vec{a}_3, \ldots \vec{a}_n$ an given by the sensor measurement devices are measured at given intervals, the value of the expression $k_1 \vec{a}_1 + k_2 \vec{a}_2 + k_3 \vec{a}_3 + \ldots + k_n \vec{a}_n$ is calculated, the value of said expression is compared to a pre-defined threshold value, and if the value of said expression deviates from the value $\vec{0}$ more than said pre-defined threshold value, an error message is given.

Preferably, said four measurement directions of the sensor measurement devices described by said four vectors are selected so that the earth gravitational force has an essential component affecting in each of the said four measurement directions.

Preferably, the measuring directions of the sensor measurement devices measuring in different directions are selected symmetrically such that the accelerations obtained as measurement results of the sensor measuring devices measuring in four different directions can be presented as equations:

$$\vec{a}_1 = c \cdot \vec{a}_x + c \cdot \vec{a}_z$$

$$\vec{a}_2 = c \cdot \vec{a}_y + c \cdot \vec{a}_z$$

$$\vec{a}_3 = -c \cdot \vec{a}_x + c \cdot \vec{a}_z$$

$$\vec{a}_4 = -c \cdot \vec{a}_y + c \cdot \vec{a}_z,$$

and that to the accelerations $\vec{a}_1$, $\vec{a}_2$, $\vec{a}_3$ and $\vec{a}_4$ obtained as measurement results of the sensor measuring devices are given the multipliers $k_1$, $k_2$, $k_3$ and $k_4$ such that $k_1=k_3=1$ and $k_2=k_4=-1$.

Preferably, the calculation of said vector expressions is implemented using scalar values. Preferably, an error message is given when m number of deviations of the value of said expression from the value $\vec{0}$ more than said pre-defined threshold value have occurred.

According to the second feature of the invention, a method is provided for the measurement of acceleration using the values of acceleration on the sensor measurement area, directed at the sensor, to the direction of three dimensions using a micromechanical acceleration sensor, which acceleration sensor comprises at least four units of sensor measurement devices measuring in different measurement directions, of which four vectors describing the measurement directions of the sensor measurement devices no three vectors belong to the same level such that in the method the continuous self-testing of the acceleration sensor during start-up and/or operation is implemented such that to the corresponding scalar values $a_1$, $a_2$, $a_3$, ... $a_n$ of the accelerations $\vec{a}_1$, $\vec{a}_2$, $\vec{a}_3$, ... $\vec{a}_n$ obtained as measurement results of the sensor measurement devices are given the multipliers $k_1$, $k_2$, $k_3$, ... $k_n$ such that, when the sensor is functioning perfectly, the value of the expression $k_1 a_1 + k_2 a_2 + k_3 a_3 + \ldots + k_n a_n$ calculates to 0, the scalar values $a_1$, $a_2$, $a_3$, ... $a_n$ of the accelerations $\vec{a}_1$, $\vec{a}_2$, $\vec{a}_3$, ... $\vec{a}_n$ given by the sensor measurement devices are measured at given intervals, the value of the expression $k_1 a_1 + k_2 a_2 + k_3 a_3 + \ldots + k_n a_n$ is calculated, the value of said expression is compared to a pre-defined threshold value, and if the value of said expression deviates from the value 0 more than said pre-defined threshold value, an error message is given.

Preferably, said four measurement directions of the sensor measurement devices described by said four vectors are selected so that the earth gravitational force has an essential component affecting in each of the said four measurement directions.

Preferably, an error message is given when m number of deviations of the value of said expression from the value 0 more than said pre-defined threshold value have occurred.

According to the third feature of the invention, a method is provided for the measurement of acceleration using the values of acceleration on the sensor measurement area, directed at the sensor, to the direction of three dimensions using a micromechanical acceleration sensor, which acceleration sensor comprises at least four units of sensor measurement devices measuring in different measurement directions, of which four vectors describing the measurement directions of the sensor measurement devices no three vectors belong to the same level such that in the method the continuous self-testing of the acceleration sensor during start-up and/or operation is implemented in the linear or linearized measurement such that to the signal levels $s_1$, $s_2$, $s_3$, ... $s_n$ corresponding to the scalar values $a_1$, $a_2$, $a_3$, ... $a_n$ of acceleration obtained as measurement results of the sensor measurement devices are given the multipliers $k_1$, $k_2$, $k_3$, ... $k_n$ such that, when the sensor is functioning perfectly, the value of the summation expression $$\sum_{i=1}^{n} k_i s_i - k_0$$

calculates to 0, the signal levels $s_1$, $s_2$, $s_3$, ... $s_n$ given by the sensor measurement devices are measured at given intervals, the value of the summation expression $$\sum_{i=1}^{n} k_i s_i - k_0$$

is calculated, the value of said summation expression is compared to a pre-defined threshold value, and if the values of said summation expressions deviate from the value 0 more than said pre-defined threshold value, an error message is given.

Preferably, said four measurement directions of the sensor measurement devices described by said four vectors are selected so that the earth gravitational force has an essential component affecting in each of the said four measurement directions.

Preferably, an error message is given when m number of deviations of the value of said expression from the value 0 more than said pre-defined threshold value have occurred.

According to the forth feature of the invention, a method is provided for the measurement of acceleration using the values of acceleration on the sensor measurement area, directed at the sensor, to the direction of two dimensions using a micromechanical acceleration sensor, which acceleration sensor comprises at least three units of sensor measurement devices measuring in different measurement directions, of which three vectors describing the measurement directions of the sensor measurement devices no two vectors are in the same direction such that in the method the continuous self-testing of the acceleration sensor during start-up and/or operation is implemented such that to the accelerations $\vec{a}_1$, $\vec{a}_2$, ... $\vec{a}_n$ obtained as measurement results of the sensor measurement devices are given the multipliers $k_1$, $k_2$, ... $k_n$ such that, when the sensor is functioning perfectly, the value of the expression $k_1 \vec{a}_1 + k_2 \vec{a}_2 + \ldots + k_n \vec{a}_n$ calculates to 0, the accelerations $\vec{a}_1$, $\vec{a}_2$, ... $\vec{a}_n$ given by the sensor measurement devices are measured at given intervals, the value of the expression $k_1 \vec{a}_1 + k_2 \vec{a}_2 + \ldots + k_n \vec{a}_n$ is calculated, the value of said expression is compared to a pre-defined threshold value, and if the value of said expression deviates from the value $\vec{0}$ more than said pre-defined threshold value, an error message is given.

Preferably, said three measurement directions of the sensor measurement devices described by said three vectors are selected so that the earth gravitational force has an essential component affecting in each of the said three measurement directions.

Preferably, the measuring directions of the sensor measurement devices measuring in different directions are selected symmetrically such that the accelerations obtained as measurement results of the sensor measuring devices measuring in four different directions can be presented as equations:

$$\vec{a}_1 = d \cdot \vec{a}_x$$

$$\vec{a}_2 = d \cdot \vec{a}_y$$

$$\vec{a}_3 = -d \cdot \vec{a}_x$$

$$\vec{a}_4 = -d \cdot \vec{a}_y,$$

and that to the accelerations $\vec{a}_1$, $\vec{a}_2$, $\vec{a}_3$ and $\vec{a}_4$ obtained as measurement results of the sensor measurement devices are given the multipliers $k_1$, $k_2$, $k_3$ and $k_4$ such that $k_1 = k_2 = k_3 = k_4 = 1$.

Preferably, the calculation of said vector expressions is implemented using scalar values. Preferably, an error message is given when m number of deviations of the value of said expression from the value $\vec{0}$ more than said pre-defined threshold value have occurred.

According to the fifth feature of the invention, a method is provided for the measurement of acceleration using the values of acceleration on the sensor measurement area, directed at the sensor, to the direction of two dimensions using a micromechanical acceleration sensor, which acceleration sensor comprises at least three units of sensor measurement devices measuring in different measurement directions, of which three vectors describing the measurement directions of the sensor measurement devices no two vectors are in the same direction such that in the method the continuous self-testing of the acceleration sensor during start-up and/or operation is implemented such that to the scalar values $a_1, a_2, \ldots a_n$ of the accelerations $\vec{a}_1, \vec{a}_2, \ldots \vec{a}_n$ obtained as measurement results of the sensor measurement devices are given the multipliers $k_1, k_2, \ldots k_n$ such that, when the sensor is functioning perfectly, the value of the expression $k_1 a_1 + k_2 a_2 + \ldots + k_n a_n$ calculates to 0, the scalar values $a_1, a_2, \ldots a_n$ of the accelerations $\vec{a}_1, \vec{a}_2, \ldots \vec{a}_n$ given by the sensor measurement devices are measured at given intervals, the value of the expression $k_1 a_1 + k_2 a_2 + \ldots + k_n a_n$ is calculated, the value of said expression is compared to a pre-defined threshold value, and if the value of said expression deviates from the value 0 more than said predetermined threshold value, an error message is given.

Preferably, said three measurement directions of the sensor measurement devices described by said three vectors are selected so that the earth gravitational force has an essential component affecting in each of the said three measurement directions.

Preferably, an error message is given when m number of deviations of the value of said expression from the value 0 more than said pre-defined threshold value have occurred.

According to the sixth feature of the invention, a method is provided for the measurement of acceleration using the values of acceleration on the sensor measurement area, directed at the sensor, to the direction of two dimensions using a micromechanical acceleration sensor, which acceleration sensor comprises at least three units of sensor measurement devices measuring in different measurement directions, of which three vectors describing the measurement directions of the sensor measurement devices no two vectors are in the same direction such that in the method the continuous self-testing of the acceleration sensor during start-up and/or operation is implemented in the linear or linearized measurement such that to the signal levels $s_1, s_2, \ldots s_n$ corresponding to the scalar values $a_1, a_2, \ldots a_n$ of acceleration obtained as measurement results of the sensor measurement devices are given the multipliers $k_1, k_2, \ldots k_n$ such that, when the sensor is functioning perfectly, the value of the summation expression $$\sum_{i=1}^{n} k_i s_i - k_0$$

calculates to 0, the signal levels $s_1, s_2, \ldots s_n$ given by the sensor measuring devices are measured at given intervals, the value of the summation expression $$\sum_{i=1}^{n} k_i s_i - k_0$$

is calculated, the value of said summation expression is compared to a pre-defined threshold value, and if the values of said summation equations deviate from the value 0 more than said pre-defined threshold value, an error message is given.

Preferably, said three measurement directions of the sensor measurement devices described by said three vectors are selected so that the earth gravitational force has an essential component affecting in each of the said three measurement directions.

Preferably, an error message is given when m number of deviations of the values of said summation expressions from the value 0 more than said pre-defined threshold value have occurred.

According to the seventh feature of the invention, a micromechanical acceleration sensor is provided for the measurement of acceleration using the values of acceleration on the sensor measurement area, directed at the sensor, to the direction of three dimensions, which acceleration sensor comprises at least four units of sensor measurement devices measuring in different measurement directions, of which four vectors describing the measurement directions of the sensor measurement devices no three vectors belong to the same level such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the values of the accelerations $\vec{a}_1, \vec{a}_2, \vec{a}_3, \ldots \vec{a}_n$ obtained as measurement results to the sensor self-testing block, the sensor self-testing block comprises means for giving the multipliers $k_1, k_2, k_3, \ldots k_n$ to the accelerations $\vec{a}_1, \vec{a}_2, \vec{a}_3, \ldots \vec{a}_n$ obtained as measurement results of the sensor measurement devices such that, when the sensor is functioning perfectly, the value of the expression $k_1 \vec{a}_1 + k_2 \vec{a}_2 + k_3 \vec{a}_3 + \ldots + k_n \vec{a}_n$ calculates to 0, sensor self-testing block further comprises means for calculating the value of the expression $k_1 \vec{a}_1 + k_2 \vec{a}_2 + k_3 \vec{a}_3 + \ldots + k_n \vec{a}_n$ to the accelerations $a_1, a_2, a_3, \ldots a_n$ obtained as measurement results of the sensor measurement devices and measured at given intervals, and means for giving the value of said expression to the sensor comparison block, the sensor comparison block comprises means for comparing the value of said expression $k_1 \vec{a}_1 + k_2 \vec{a}_2 + k_3 \vec{a}_3 + \ldots + k_n \vec{a}_n$ to a given pre-defined threshold value, and the sensor comparison block further comprises means for giving an error message to the alarm block, if the value of said expression deviates from the value $\vec{0}$ more than said pre-defined threshold value.

Preferably, said four measurement directions of the sensor measurement devices described by said four vectors are selected so that the earth gravitational force has an essential component affecting in each of the said four measurement directions.

Preferably, the measurement directions of the sensor measurement devices measuring in different measurement directions are chosen symmetrically such that the accelerations obtained as measurement results of the sensor measurement devices measuring in four different directions can be presented as equations:

$$\vec{a}_1 = c \cdot \vec{a}_x + c \cdot \vec{a}_z$$

$$\vec{a}_2 = c \cdot \vec{a}_y + c \cdot \vec{a}_z$$

$$\vec{a}_3 = -c \cdot \vec{a}_x + c \cdot \vec{a}_z$$

$$\vec{a}_4 = -c \cdot \vec{a}_y + c \cdot \vec{a}_z,$$

and that to the accelerations $\vec{a}_1, \vec{a}_2, \vec{a}_3$ and $\vec{a}_4$ obtained as measurement results of the sensor measurement devices are given the multipliers $k_1, k_2, k_3$ and $k_4$ such that $k_1 = k_3 = 1$ and $k_2 = k_4 = -1$.

Preferably, the calculation of said vector expressions is implemented using scalar values. Preferably, an error message is given when m number of deviations of the value of said expression from the value $\vec{0}$ more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

According to the eighth feature of the invention, a micromechanical acceleration sensor is provided for the measurement of acceleration using the values of acceleration on the sensor measurement area, directed at the sensor, to the direction of three dimensions, which acceleration sensor comprises at least four units of sensor measurement devices measuring in different measurement directions, of which four vectors describing the measurement directions of the sensor measurement devices no three vectors belong to the same level such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving scalar values $a_1, a_2, a_3, \ldots a_n$ of the accelerations $\vec{a}_1, \vec{a}_2, \vec{a}_3, \ldots \vec{a}_n$ obtained as measurement results to the sensor self-testing block, the sensor self-testing block comprises means for giving the multipliers $k_1, k_2, k_3, \ldots k_n$ to the scalar values $a_1, a_2, a_3, \ldots a_n$ of the accelerations $\vec{a}_1, \vec{a}_2, \vec{a}_3, \ldots \vec{a}_n$ obtained as measurement results of the sensor measurement devices such that, when the sensor is functioning perfectly, the value of the expression $k_1 a_1 + k_2 a_2 + k_3 a_3 + \ldots + k_n a_n$ calculates to 0, the sensor self-testing block further comprises means for calculating the value of the expression $k_1 a_1 + k_2 a_2 + k_3 a_3 + \ldots + k_n a_n$ to the accelerations $\vec{a}_1, \vec{a}_2, \vec{a}_3, \ldots \vec{a}_n$ obtained as measurement results of the sensor measurement devices and measured at given intervals, and means for giving the value of said expression to the sensor comparison block, the sensor comparison block comprises means for comparing the value of said expression $k_1 a_1 + k_2 a_2 + k_3 a_3 + \ldots + k_n a_n$ to a given pre-defined threshold value, and the sensor comparison block further comprises means for giving an error message to the alarm block, if the value of said expression deviates from the value 0 more than said pre-defined threshold value.

Preferably, said four measurement directions of the sensor measurement devices described by said four vectors are selected so that the earth gravitational force has an essential component affecting in each of the said four measurement directions.

Preferably, an error message is given when m number of deviations of the value of said expression from the value 0 more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

According to the ninth feature of the invention, a micromechanical acceleration sensor is provided for the measurement of acceleration using the values of acceleration on the sensor measurement area, directed at the sensor, to the direction of three dimensions, which acceleration sensor comprises at least four units of sensor measurement devices measuring in different measurement directions, of which four vectors describing the measurement directions of the sensor measurement devices no three vectors belong to the same level such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the signal levels $s_1, s_2, s_3, \ldots s_n$ corresponding to the scalar values $a_1, a_2, a_3, \ldots a_n$ of acceleration obtained as measurement results to the sensor self-testing block, the sensor self-testing block comprises means for giving the multipliers $k_1, k_2, k_3, \ldots k_n$ to the signal levels $s_1, s_2, \ldots s_3, \ldots s_n$ corresponding to the scalar values $a_1, a_2, a_3, \ldots a_n$ of acceleration obtained as measurement results of the sensor measurement devices such that, when the sensor is functioning perfectly, the value of the summation expression $$\sum_{i=1}^{n} k_i s_i - k_0$$

calculates to 0, the sensor self-testing block further comprises means for calculating the value of the summation expression $$\sum_{i=1}^{n} k_i s_i - k_0$$

to the signal levels $s_1, s_2, s_3, \ldots s_n$ corresponding to the scalar values $a_1, a_2, a_3, \ldots a_n$ of acceleration obtained as measurement results of the sensor measurement devices and measured at given intervals, and means for giving the value of said expression to the sensor comparison block, the sensor comparison block comprises means for comparing the value of said summation expression $$\sum_{i=1}^{n} k_i s_i - k_0$$

to a given pre-defined threshold value, and the sensor comparison block further comprises means for giving an error message to the alarm block, if the value of said expression deviates from the value 0 more than said pre-defined threshold value.

Preferably, said four measurement directions of the sensor measurement devices described by said four vectors are selected so that the earth gravitational force has an essential component affecting in each of the said four measurement directions.

Preferably, an error message is given when m number of deviations of the value of said expression from the value 0 more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

According to the tenth feature of the invention, a micromechanical acceleration sensor is provided for the measurement of acceleration using the values of acceleration on the sensor measurement area, directed at the sensor, to the direction of two dimensions, which acceleration sensor comprises at least three units of sensor measurement devices measuring in different measurement directions, of which three vectors describing the measurement directions of the sensor measurement devices no two vectors are in the same direction such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the values of the accelerations $\vec{a}_1, \vec{a}_2, \ldots \vec{a}_n$ obtained as measurement results to the sensor self-testing block, the sensor self-testing block comprises means for giving the multipliers $k_1, k_2, \ldots k_n$ to the accelerations $\vec{a}_1, \vec{a}_2, \ldots \vec{a}_n$ obtained as measurement results of the sensor measurement devices such that, when the sensor is functioning perfectly, the value of the expression $k_1 \vec{a}_1 + k_2 \vec{a}_2 + \ldots + k_n \vec{a}_n$ calculates to 0, the sensor self-testing block further comprises means for calculating the value of the expression $k_1 \vec{a}_1 + k_2 \vec{a}_2 + \ldots + k_n \vec{a}_n$ to the accelerations $a_1, a_2, \ldots$ an, obtained as measurement results of the sensor measurement devices and measured at given intervals, and means for giving the value of said expression to the sensor comparison block, the sensor comparison block comprises means for comparing the value of said expression $k_1 \vec{a}_1 + k_2 \vec{a}_2 + \ldots + k_n \vec{a}_n$ to a given pre-defined threshold value, and the sensor comparison block further comprises means for giving an error message to the alarm block, if the value of said expression deviates from the value $\vec{0}$ more than said pre-defined threshold value.

Preferably, said three measurement directions of the sensor measurement devices described by said three vectors are selected so that the earth gravitational force has an essential component affecting in each of the said three measurement directions.

Preferably, the measurement directions of the sensor measurement devices measuring in different measurement directions are chosen symmetrically such that the accelerations obtained as measurement results of the sensor measurement devices measuring in four different directions can be presented as equations:

$\vec{a}_1 = d \cdot \vec{a}_x$ $\vec{a}_2 = d \cdot \vec{a}_y$ $\vec{a}_3 = -d \cdot \vec{a}_x$ $\vec{a}_4 = -d \cdot \vec{a}_y,$ and that to the accelerations $\vec{a}_1$, $\vec{a}_2$, $\vec{a}_3$ and $\vec{a}_4$ obtained as measurement results of the sensor measuring devices are given the multipliers $k_1$, $k_2$, $k_3$ and $k_4$ such that $k_1 = k_2 = k_3 = k_4 = 1$.

Preferably, the calculation of said vector expressions is implemented using scalar values. Preferably, an error message is given when m number of deviations of the value of said expression from the value $\vec{0}$ more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

According to the eleventh feature of the invention, a micromechanical acceleration sensor is provided for the measurement of acceleration using the values of acceleration on the sensor measurement area, directed at the sensor, to the direction of two dimensions, which acceleration sensor comprises at least three units of sensor measurement devices measuring in different measurement directions, of which three vectors describing the measurement directions of the sensor measurement devices no two vectors are in the same direction such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the scalar values $a_1, a_2, \ldots a_n$ of the accelerations $\vec{a}_1, \vec{a}_2, \ldots \vec{a}_n$ obtained as measurement results to the sensor self-testing block, the sensor self-testing block comprises means for giving the multipliers $k_1, k_2, \ldots k_n$ to the scalar values $a_1, a_2, \ldots a_n$ of the accelerations $\vec{a}_1, \vec{a}_2, \ldots \vec{a}_n$ obtained as measurement results of the sensor measurement devices such that, when the sensor is functioning perfectly, the value of the expression $k_1 a_1 + k_2 a_2 + \ldots + k_n a_n$ calculates to 0, the sensor self-testing block further comprises means for calculating the value of the expression $k_1 a_1 + k_2 a_2 + \ldots + k_n a_n$ to the accelerations $\vec{a}_1, \vec{a}_2, \ldots \vec{a}_n$ obtained as measurement results of the sensor measurement devices and measured at given intervals, and means for giving the value of said expression to the sensor comparison block, the sensor comparison block comprises means for comparing the value of said expression $k_1 a_1 + k_2 a_2 + \ldots + k_n a_n$ to a given pre-defined threshold value, and the sensor comparison block further comprises means for giving an error message to the alarm block, if the value of said expression deviates from the value 0 more than said pre-defined threshold value.

Preferably, said three measurement directions of the sensor measurement devices described by said three vectors are selected so that the earth gravitational force has an essential component affecting in each of the said three measurement directions.

Preferably, an error message is given when m number of deviations of the value of said expression from the value 0 more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

According to the twelfth feature of the invention, a micromechanical acceleration sensor is provided for the measurement of acceleration using the values of acceleration on the sensor measurement area, directed at the sensor, to the direction of two dimensions, which acceleration sensor comprises at least three units of sensor measurement devices measuring in different measurement directions, of which three vectors describing the measurement directions of the sensor measurement devices no two vectors are in the same direction such that the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the signal levels $s_1, s_2, \ldots s_n$ corresponding to the scalar values $a_1, a_2, \ldots a_n$ of acceleration obtained as measurement results to the sensor self-testing block, the sensor self-testing block comprises means for giving the multipliers $k_1, k_2, \ldots k_n$ to the signal levels $s_1, s_2, \ldots s_n$ corresponding to the scalar values $a_1, a_2, \ldots a_n$ of acceleration obtained as measurement results of the sensor measurement devices such that, when the sensor is functioning perfectly, the value of the summation expression $$\sum_{i=1}^{n} k_i s_i - k_0$$

calculates to 0, the sensor self-testing block further comprises means for calculating the value of the summation expression $$\sum_{i=1}^{n} k_i s_i - k_0$$

to the signal levels $s_1, s_2, \ldots s_n$ corresponding to the scalar values $a_1, a_2, \ldots a_n$ of acceleration obtained as measurement results of the sensor measurement devices and measured at given intervals, and means for giving the value of said expression to the sensor comparison block, the sensor comparison block comprises means for comparing the value of said summation expression $$\sum_{i=1}^{n} k_i s_i - k_0$$

to a given pre-defined threshold value, and
the sensor comparison block further comprises means for giving an error message to the alarm block, if the value of said expression deviates from the value 0 more than said pre-defined threshold value.

Preferably, said three measurement directions of the sensor measurement devices described by said three vectors are selected so that the earth-gravitational force has an essential component affecting in each of the said three measurement directions.

Preferably, an error message is given when m number of deviations of the value of said expression from the value 0 more than said pre-defined threshold value have occurred.

Preferably, the sensor comparison block is connected to the sensor self-testing block. Further preferably, the sensor measurement block is connected to the sensor self-testing block. Further preferably, the sensor alarm block is connected to the sensor comparison block.

BRIEF DESCRIPTION OF THE DRAWINGS

In the following the invention and its preferred embodiments are described in detail with reference, by way of an example, to the accompanying FIG. 1, which shows a micromechanical acceleration sensor solution according to the invention.

DETAILED DESCRIPTION OF THE INVENTION

Figure 1:
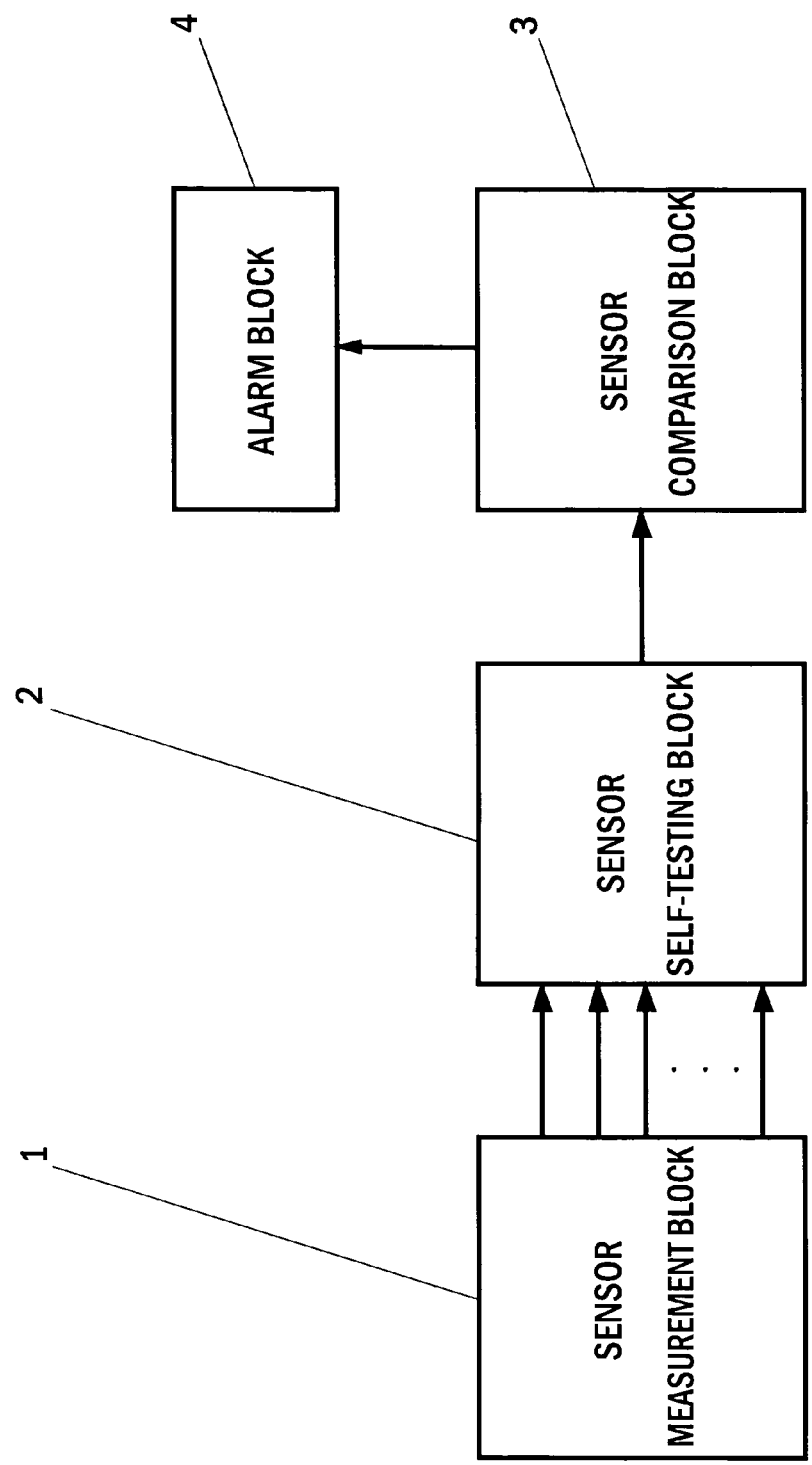

A micromechanical acceleration sensor solution according to the invention is implemented using sensor measurement devices measuring in several different directions. For measurement of acceleration directed to three dimensions there must be at least four units of these sensor measurement devices measuring in several different directions. Additionally, in this case, the measurement directions of the sensor measurement devices must be selected such that of vectors describing the measurement directions of the sensor measurement devices measuring in several different directions four vectors can be selected such that of these four vectors no three vectors belong to the same level.

One can select said four measurement directions of the sensor measurement devices described by said four vectors so that the earth gravitational force has an essential component affecting in each of the said four measurement directions. This means that none of the selected four measurement directions are perpendicular to or almost perpendicular to the earth gravitational force. As the earth gravitational force affects in each of the said four measurement directions, this increases the micromechanical acceleration sensor's capability to detect errors.

In conventional Cartesian rectangular space coordinates the unit vectors in x-, y- and z-directions are $\vec{i}$, $\vec{j}$ and $\vec{k}$. The accelerations $\vec{a}_i$ obtained in the selected directions of the sensor measurement devices can be divided into components in x-, y- and z-directions $\vec{a}_i = \vec{a}_{xi} + \vec{a}_{yi} + \vec{a}_{zi}$ or alternatively using unit vectors in x-, y- and z-directions $\vec{i}$, $\vec{j}$ and $\vec{k}$ described as $\vec{a}_i = a_{xi}\vec{i} + a_{yi}\vec{j} + a_{zi}\vec{k}$. As the angles between the selected directions of measurement and x-, y- and z-directions can be selected $\alpha_i$, $\beta_i$ and $\chi_i$, wherein $\alpha_i$ describes the angle between $\vec{a}_i$ and $\vec{a}_{xi}$, and correspondingly, $\beta_i$ describes the angle between $\vec{a}_i$ and $\vec{a}_{yi}$, and further, $\chi_i$ describes the angle between $\vec{a}_i$ and $\vec{a}_{zi}$. Correspondingly, $a_i$ describes the scalar reading of acceleration of the acceleration vector $\vec{a}_i$ in the direction of measurement.

In the method according to the invention for the measurement of acceleration directed to three dimensions using a micromechanical acceleration sensor, the accelerations obtained as measurement results of the sensor measurement devices measuring in several different directions can, when divided into components in x-, y- and z-directions, be described as equations:

$$\vec{a}_1 = a_1 \cos \alpha_1 \cdot \vec{i} + a_1 \cos \beta_1 \vec{j} + a_1 \cos \chi_1 \cdot \vec{k}$$

$$\vec{a}_2 = a_2 \cos \alpha_2 \cdot \vec{i} + a_2 \cos \beta_2 \vec{j} + a_2 \cos \chi_2 \cdot \vec{k}$$

$$\vec{a}_3 = a_3 \cos \alpha_3 \cdot \vec{i} + a_3 \cos \beta_3 \vec{j} + a_3 \cos \chi_3 \cdot \vec{k}$$

...

$$\vec{a}_n = a_n \cos \alpha_n \cdot \vec{i} + a_n \cos \beta_n \vec{j} + a_n \cos \chi_n \cdot \vec{k}$$

Because the measurement directions of the sensor measurement devices are selected in advance, the values of the constants of the equation set $\cos \alpha_1, \cos \alpha_2, \cos \alpha_3, \ldots \cos \alpha_n$, $\cos \beta_1, \cos \beta_2, \cos \beta_3, \ldots \cos \beta_n$ and $\cos \chi_1, \cos \chi_2, \cos \chi_3, \ldots \cos \chi_n$ are also known already prior to measurement. Additionally, for the directional cosines applies: $(\cos \alpha_i)^2 + (\cos \beta_i)^2 + (\cos \chi_i)^2 = 1$.

The vector $\vec{a}_i$ can also be expressed in the form $\vec{a}_i = a_i \cdot \vec{u}_i$, where $a_i$ is the scalar value of the vector $\vec{a}_i$, and correspondingly, $\vec{u}_i$ is the unit vector in the direction of measurement, that is stated using the directional cosines as $\vec{u}_i = \cos \alpha_i \cdot \vec{i} + \cos \beta_i \cdot \vec{j} + \cos \chi_i \cdot \vec{k}$.

When acceleration $\vec{a} = a_x \vec{i} + a_y \vec{j} + a_z \vec{k}$ affects the sensor, the scalar value $a_i$ of the measurement result vector $\vec{a}_i$ can be calculated as a dot product of the acceleration vector a affecting the sensor and the unit vector $\vec{u}_i$ in the direction of measurement:

$$a_i = \vec{a} \cdot \vec{u}_i = a_x \cos \alpha_i + a_y \cos \beta_i + a_z \cos \chi_i.$$

Correspondingly, the measurement result vector $\vec{a}_i$ can be calculated as a projection of the acceleration vector a affecting the sensor in the direction of measurement:

$$\vec{a}_i = (\vec{a} \cdot \vec{u}_i) \cdot \vec{u}_i = (a_x \cos \alpha_i + a_y \cos \beta_i + a_z \cos \chi_i) \cdot (\cos \alpha_i \cdot \vec{i} + \cos \beta_i \cdot \vec{j} + \cos \chi_i \cdot \vec{k}).$$

In the method according to the invention, the continuous self-testing of the acceleration sensor during start-up and/or operation is implemented such that to the accelerations $\vec{a}_1$, $\vec{a}_2$, $\vec{a}_3$, ... $\vec{a}_n$ obtained as measurement results of the sensor measurement devices are given the multipliers $k_1, k_2, k_3, \ldots$ $k_n$ such that, when the sensor is functioning perfectly, the value of the expression $k_1 \vec{a}_1 + k_2 \vec{a}_2 + k_3 \vec{a}_3 + \ldots + k_n \vec{a}_n$ calculates to 0.

In the method according to the invention, the accelerations $\vec{a}_1, \vec{a}_2, \vec{a}_3, \ldots \vec{a}_n$ given by the sensor measurement devices are measured at given intervals, after which the value of the expression $k_1 \vec{a}_1 + k_2 \vec{a}_2 + k_3 \vec{a}_3 + \ldots + k_n \vec{a}_n$ is calculated. The value of the expression is compared to said given pre-defined threshold value, and if the value of said expression deviates from the value $\vec{0}$ more than said pre-defined threshold value, an error message is given. Typically, an error message is given when m number of deviations of the value of said expression from the value $\vec{0}$ more than said pre-defined threshold value have occurred.

In the method according to the invention, the calculation of the vector equations and vector expressions of acceleration can in practise be implemented using scalar values. In place of the equation $k_1 \vec{a}_1 + k_2 \vec{a}_2 + k_3 \vec{a}_3 + \ldots + k_n \vec{a}_n = 0$ can be written the equation $k_1 a_1 + k_2 a_2 + k_3 a_3 + \ldots + k_n a_n = 0$. If into this is inserted projections of the dominant acceleration vector $\vec{a} = a_x \vec{i} + a_y \vec{j} + a_z \vec{k}$ in each measurement direction, the equation obtained is:

$$\sum_{i=1}^{n} k_i a_i = \sum_{i=1}^{n} k_i (a_x \cos\alpha_i + a_y \cos\beta_i + a_z \cos\chi_i) = 0$$

This has to be implemented using the value of any dominant acceleration $\vec{a}$, from which follows an equation set for solving the multipliers $k_i$ $$\sum_{i=1}^{n} k_i \cos\alpha_i = 0$$

$$\sum_{i=1}^{n} k_i \cos\beta_i = 0$$

$$\sum_{i=1}^{n} k_i \cos\chi_i = 0.$$

Multipliers $k_i$ can be found, if the directions of measurement are selected to be adequately different in direction. Using multipliers found in this way, in the method according to the invention, the value of the expression $k_1 a_1 + k_2 a_2 + k_3 a_3 + \ldots + k_n a_n$ can be calculated and compared to a pre-set threshold value.

Typically, in the linear or linearized measurement of acceleration, acceleration is measured as a linear signal value, wherein the scalar value $a_i$ of each acceleration can be calculated from the signal level in the following manner:

$$a_i = b_i (s_i - s_{0i}).$$

In the method according to the invention, in place of the equation based on acceleration results $k_1 a_1 + k_2 a_2 + k_3 a_3 + \ldots + k_n a_n = 0$ an equation based on signal values can be used:

$$k_1 s_1 + k_2 s_2 + k_3 s_3 + \ldots + k_n s_n - k_0 = 0.$$

If into this is inserted the signal values $$s_i = \frac{a_i}{b_i} + s_{0i}$$

corresponding to the acceleration measurement results from the previously solved equation as well as the scalar values $a_i$ of the measurement result vector $\vec{a}_i$ of the dominant acceleration vector $\vec{a} = a_x \vec{i} + a_y \vec{j} + a_z \vec{k}$ in each measurement direction, the equation obtained is:

$$\sum_{i=1}^{n} k_i s_i - k_0 = \sum_{i=1}^{n} \frac{k_i}{b_i}(a_x\cos\alpha_i + a_y\cos\beta_i + a_z\cos\chi_i) + \sum_{i=1}^{n} k_i s_{0i} - k_0 = 0.$$

This has to be implemented using the value of any dominant acceleration $\vec{a}$, from which follows an equation set for solving the multipliers $k_i$ $$\sum_{i=1}^{n} \frac{k_i}{b_i}\cos\alpha_i = \sum_{i=1}^{n} k_i h_{ix} = 0$$

$$\sum_{i=1}^{n} \frac{k_i}{b_i}\cos\beta_i = \sum_{i=1}^{n} k_i h_{iy} = 0$$

$$\sum_{i=1}^{n} \frac{k_i}{b_i}\cos\chi_i = \sum_{i=1}^{n} k_i h_{iz} = 0$$

$$\sum_{i=1}^{n} k_i s_{0i} = k_0.$$

The constant $k_0$ describes the offset constant of the entire sensor arrangement, which can be used to allow consideration, for example, for a calibration error of the zero point of the sensor as well as influences on the measuring event caused by variations in humidity or temperature. Constants $h_{ix}$, $h_{iy}$ and $h_{iz}$ describe the sensitivities of the measurement signal $s_i$ of the sensor in x-, y- and z-directions.

In an alternate method according to the invention, the continuous self-testing of the acceleration sensor during start-up and/or operation is implemented in the linear or linearized measurement such that when the x-, y-, and z-directional signal measurement sensitivities $h_{ix}$, $h_{iy}$ and $h_{iz}$ of the sensor measurement devices and the offset constant $k_0$ are known in advance, to the signal levels $s_1, s_2, s_3, \ldots s_n$ corresponding to the scalar values $a_1, a_2, a_3, \ldots a_n$ obtained as measurement results of the sensor measurement devices are given the multipliers $k_1, k_2, k_3, \ldots k_n$ such that, when the sensor is functioning perfectly, the value of the summation equation $$\sum_{i=1}^{n} k_i s_i - k_0$$

calculates to 0.

In the method according to the invention, the signal levels $s_1, s_2, s_3, \ldots s_n$ given by the sensor measurement devices are measured at given intervals, after which the value of the summation equation $$\sum_{i=1}^{n} k_i s_i - k_0$$

is calculated. The value of the summation equation is compared to said given pre-defined threshold value, and if the value of said equation deviates from the value 0 more than the pre-defined threshold value, an error message is given. Typically, an error message is given when m number of deviations of the value of said summation expression from the value 0 more than said pre-defined threshold value have occurred.

Correspondingly, in the measurement of acceleration directed to two dimensions there must be at least three units of these sensor measurement devices measuring in several different directions. Additionally, in this case, the measurement directions of the sensor measurement devices must be selected such that of vectors describing the measurement directions of the sensor measurement devices measuring in several different directions three vectors can be selected such that of these three vectors no two vectors are in the same direction.

One can select said three measurement directions of the sensor measurement devices described by said three vectors so that the earth gravitational force has an essential component affecting in each of the said three measurement directions. This means that none of the selected three measurement directions are perpendicular to or almost perpendicular to the earth gravitational force. As the earth gravitational force affects in each of the said three measurement directions, this increases the micromechanical acceleration sensor's capability to detect errors.

In conventional Cartesian rectangular plane coordinates the unit vectors in x- and y-directions are $\vec{i}$ and $\vec{j}$. The accelerations $\vec{a}_i$ obtained in the selected directions of the sensor measurement devices can be divided into components in x- and y-directions $\vec{a}_i = \vec{a}_{xi} + \vec{a}_{yi}$ or alternatively using unit vectors in x- and y-directions $\vec{i}$ and $\vec{j}$ described as $\vec{a}_i = a_{xi} \vec{i} + a_{yi} \vec{j}$. As the angles between the selected directions of measurement and the x- and y-directions can be selected $\alpha_i$ and $\beta_i$, wherein $\alpha_i$ describes the angle between $\vec{a}_i$ and $\vec{a}_{xi}$, and correspondingly, $\beta_i$ describes the angle between $\vec{a}_i$ and $\vec{a}_{yi}$. Correspondingly, $\vec{a}_i$ describes the scalar reading of acceleration of the acceleration vector $\vec{a}_i$ in the direction of measurement.

In the method according to the invention for the measurement of acceleration directed to two dimensions using a micromechanical acceleration sensor, the accelerations obtained as measurement results of the sensor measurement devices measuring in several different directions can, when divided into components in x- and y-directions, be described as equations:

$$\vec{a}_1 = a_1 \cos \alpha_1 \cdot \vec{i} + a_1 \cos \beta_1 \cdot \vec{j}$$

$$\vec{a}_2 = a_2 \cos \alpha_2 \cdot \vec{i} + a_2 \cos \beta_2 \cdot \vec{j}$$

$$\ldots$$

$$\vec{a}_n = a_n \cos \alpha_n \cdot \vec{i} + a_n \cos \beta_n \cdot \vec{j}.$$

Because the measurement directions of the sensor measurement devices are selected in advance, the values of the constants of the equation set $\cos \alpha_1, \cos \alpha_2, \cos \alpha_3, \ldots \cos \alpha_n$ and $\cos \beta_1, \cos \beta_2, \cos \beta_3, \ldots \cos \beta_n$ are also known already prior to measurement. Additionally, for directional cosines applies: $(\cos \alpha_i)^2 + (\cos \beta_i)^2 = 1$.

The vector $\vec{a}_i$ can also be expressed in the form $\vec{a}_i = a_i \cdot \vec{u}_i$, where $a_i$ is the scalar value of the vector $\vec{a}_i$, and correspondingly, $u_i$ is the unit vector in the direction of measurement, that is stated using the directional cosines as $\vec{u}_i = \cos \alpha_i \cdot \vec{i} + \cos \beta_i \cdot \vec{j}$.

When acceleration $\vec{a} = a_x \vec{i} + a_y \vec{j}$ affects the sensor, the scalar value $a_i$ of the measurement result vector $\vec{a}_i$ can be calculated as a dot product of the acceleration vector $\vec{a}$ affecting the sensor and the unit vector $\vec{u}_i$ in the direction of measurement:

$$a_i = \vec{a} \cdot \vec{u}_i = a_x \cos \alpha_i + a_y \cos \beta_i.$$

Correspondingly, the measurement result vector $\vec{a}_i$ can be calculated as a projection of the acceleration vector $\vec{a}$ affecting the sensor in the direction of measurement:

$$\vec{a}_i = (\vec{a} \cdot \vec{u}_i) \cdot \vec{u}_i = (a_x \cos \alpha_i + a_y \cos \beta_i) \cdot (\cos \alpha_i \cdot \vec{i} + \cos \beta_i \cdot \vec{j}).$$

In the method according to the invention, the continuous self-testing of the acceleration sensor during start-up and/or operation is implemented such that to the accelerations $\vec{a}_1, \vec{a}_2, \ldots \vec{a}_n$ obtained as measurement results of the sensor measurement devices are given the multipliers $k_1, k_2, k_3, \ldots k_n$ such that, when the sensor is functioning perfectly, the value of the expression $k_1 \vec{a}_1 + k_2 \vec{a}_2 + \ldots + k_n \vec{a}_n$ calculates to $\vec{0}$.

In the method according to the invention, the accelerations $\vec{a}_1, \vec{a}_2, \ldots \vec{a}_n$, given by the sensor measurement devices are measured at given intervals, after which the value of the expression $k_1 \vec{a}_1 + k_2 \vec{a}_2 + \ldots + k_n \vec{a}_n$ is calculated. The value of the expression is compared to said given pre-defined threshold value, and if the value of said expression deviates from the value $\vec{0}$ more than said pre-defined threshold value, an error message is given. Typically, an error message is given when m number of deviations of the value of said expression from the value $\vec{0}$ more than said pre-defined threshold value have occurred.

In the method according to the invention, the calculation of the vector equations and vector expressions of acceleration can in practise be implemented using scalar values. In place of the equation $k_1 \vec{a}_1 + k_2 \vec{a}_2 + \ldots + k_n \vec{a}_k = \vec{0}$ can be written the equation $k_1 a_1 + k_2 a_2 + \ldots + k_n a_n = 0$. If into this is inserted projections of the dominant acceleration vector $\vec{a} = a_x \vec{i} + a_y \vec{j}$ in each measurement direction, the equation obtained is:

$$\sum_{i=1}^{n} k_i a_i = \sum_{i=1}^{n} k_i(a_x \cos\alpha_i + a_y \cos\beta_i) = 0.$$

This has to be implemented using the value of any dominant acceleration $\vec{a}$, from which follows the equation set for solving the multipliers $k_i$ $$\sum_{i=1}^{n} k_i \cos\alpha_i = 0$$

$$\sum_{i=1}^{n} k_i \cos\beta_i = 0.$$

Multipliers $k_i$ can be found, if the directions of measurement are selected to be adequately different in direction. Using multipliers found in this way, in the method according to the invention, the value of the expression $k_1 a_1 + k_2 a_2 + \ldots + k_n a_n$ can be calculated and compared to a pre-set threshold value.

Typically, in the linear or linearized measurement of acceleration, acceleration is measured as a linear signal value, wherein the scalar value $a_i$ of each acceleration can be calculated from the signal level in the following manner:

$$a_i = b_i \cdot (s_i - s_{0i})$$

In the method according to the invention, in place of the equation based on acceleration results $k_1 a_1 + k_2 a_2 + \ldots + k_n a_n = 0$ an equation based on signal values can be used:

$$k_1 s_1 + k_2 s_2 + \ldots + k_n s_n - k_0 = 0.$$

If into this is inserted the signal values $$s_i = \frac{a_i}{b_i} + s_{0i}$$

corresponding to the acceleration measurement results from the previously solved equation as well as the scalar values $a_i$ of the measurement result vector $\vec{a}_i$ of the dominant acceleration vector $\vec{a} = a_x \vec{i} + a_y \vec{j}$ each measurement direction, the equation obtained is:

$$\sum_{i=1}^{n} k_i s_i - k_0 = \sum_{i=1}^{n} \frac{k_i}{b_i}(a_x \cos\alpha_i + a_y \cos\beta_i) + \sum_{i=1}^{n} k_i s_{0i} - k_0 = 0.$$

This has to be implemented using the value of any dominant acceleration $\vec{a}$, from which follows an equation set for solving the multipliers $k_i$ $$\sum_{i=1}^{n} \frac{k_i}{b_i} \cos\alpha_i = \sum_{i=1}^{n} k_i h_{ix} = 0$$

$$\sum_{i=1}^{n} \frac{k_i}{b_i} \cos\beta_i = \sum_{i=1}^{n} k_i h_{iy} = 0$$

$$\sum_{i=1}^{n} k_i s_{0i} = k_0.$$

The constant $k_0$ describes the offset constant of the entire sensor arrangement, which can be used to allow consideration, for example, for a calibration error of the zero point of the sensor as well as influences on the measuring event caused by variations in humidity or temperature. Constants $h_{ix}$ and $h_{iy}$ describe the sensitivities of the measurement signal $s_i$ of the sensor in x- and y-directions.

In an alternate method according to the invention, the continuous self-testing of the acceleration sensor during start-up and/or operation is implemented in the linear or linearized measurement such that when the x- and y-directional signal measurement sensitivities $h_{ix}$ and $h_{iy}$ of the sensor measurement devices and the offset constant $k_0$ are known in advance, to the signal levels $s_1, s_2, \ldots s_n$ corresponding to the scalar values $a_1, a_2, \ldots a_n$ obtained as measurement results of the sensor measurement devices are given the multipliers $k_1, k_2, \ldots k_n$ such that, when the sensor is functioning perfectly, the value of the summation equation $$\sum_{i=1}^{n} k_i s_i - k_0$$

calculates to 0.

In the method according to the invention, the signal levels $s_1, s_2, \ldots s_n$ given by the sensor measurement devices are measured at given intervals, after which the value of the summation equation $$\sum_{i=1}^{n} k_i s_i - k_0$$

is calculated. The value of the summation equation is compared to said given pre-defined threshold value, and if the value of said equation deviates from the value 0 more than the pre-defined threshold value, an error message is given. Typically, an error message is given when m number of deviations of the value of said summation expression from the value 0 more than said pre-defined threshold value have occurred.

FIG. 1 on shows a micromechanical acceleration sensor solution according to the invention. A micromechanical acceleration sensor solution according to the invention comprises a sensor measurement block 1, a sensor self-testing block 2, a sensor comparison block 3 and an alarm block 4.

A micromechanical acceleration sensor solution according to the invention comprises means 1-4 for implementing continuous self-testing during start-up and/or operation such that first, in the sensor measurement block 1, the accelerations $\vec{a}_1, \vec{a}_2, \vec{a}_3, \ldots a_n$ are obtained as measurement results of the sensor measurement devices measuring in three directions. Next, in the sensor self-testing block 2, the multipliers $k_1, k_2, k_3, \ldots k_n$ are given to the accelerations $\vec{a}_1, \vec{a}_2,$ $\vec{a}_3, \ldots \vec{a}_n$ obtained as measurement results of the sensor measurement devices such that, when the sensor is functioning perfectly, the value of the expression $k_1 \vec{a}_1 + k_2 \vec{a}_2 + k_3 \vec{a}_3 + \ldots + k_n \vec{a}_n$ calculates to 0.

In a micromechanical acceleration sensor solution according to the invention, the accelerations $\vec{a}_1, \vec{a}_2, \vec{a}_3, \ldots \vec{a}_n$ given by the sensor measurement devices are measured in the sensor measurement block 1 at given intervals, after which the value of the expression $k_1 \vec{a}_1 + k_2 \vec{a}_2 + k_3 \vec{a}_3 + \ldots + k_n \vec{a}_n$ is calculated in the sensor self-testing block 2. Further, in the sensor comparison block 3, the value of the expression is compared to said given pre-defined threshold value, and if the value of said expression deviates from the value $\vec{0}$ more than said pre-defined threshold value, an error message is given to the sensor alarm block 4.

In solution according to the invention, the sensor comparison block 3 can be connected to the sensor self-testing block 2. Further, the sensor measurement block 1 can be connected to the sensor self-testing block 2. Further, the sensor alarm block 4 can be connected to the sensor comparison block 3.

In a comparable manner, an alternative solution according to the invention comprises means 1-4 for implementing continuous self-testing during start-up and/or operation such that first, in the sensor measurement block 1, the accelerations $\vec{a}_1, \vec{a}_2, \ldots \vec{a}_n$ are obtained as measurement results of the sensor measurement devices measuring in different measurement directions. Next, in the sensor self-testing block 2, the multipliers $k_1, k_2, \ldots k_n$ are given to the accelerations $\vec{a}_1, \vec{a}_2, \ldots \vec{a}_n$ obtained as measurement results of the sensor measurement devices such that, when the sensor is functioning perfectly, the value of the expression $k_1 \vec{a}_1 + k_2 \vec{a}_2 + \ldots + k_n \vec{a}_n$ calculates to $\vec{0}$.

In an alternative micromechanical acceleration sensor solution according to the invention, the accelerations $\vec{a}_1, \vec{a}_2, \ldots \vec{a}_n$ given by the sensor measurement devices are measured in the sensor measurement block 1 at given intervals, after which the value of the expression $k_1 \vec{a}_1 + k_2 \vec{a}_2 + \ldots + k_n \vec{a}_n$ is calculated in the sensor self-testing block 2. Further, in the sensor comparison block 3, the value of the expression is compared to said given pre-defined threshold value, and if the value of said expression deviates from the value $\vec{0}$ more than said pre-defined threshold value, an error message is given to the alarm block 4.

Also in an alternative solution according to the invention, the sensor comparison block 3 can be connected to the sensor self-testing block 2. Further, the sensor measurement block 1 can be connected to the sensor self-testing block 2. Further, the sensor alarm block 4 can be connected to the sensor comparison block 3.

In the method according to the invention for the measurement of acceleration directed to three dimensions using a micromechanical acceleration sensor, the measurement directions of the sensor measurement devices measuring in different measurement directions can, for example, be selected symmetrically such that the accelerations obtained as measurement results of sensor measurement devices measuring in four different directions can be presented as equations:

$$\vec{a}_1 = c \cdot \vec{a}_x + c \cdot \vec{a}_z$$

$$\vec{a}_2 = c \cdot \vec{a}_y + c \cdot \vec{a}_z$$

$$\vec{a}_3 = -c \cdot \vec{a}_x + c \cdot \vec{a}_z.$$

$$\vec{a}_4 = -c \cdot \vec{a}_y + c \cdot \vec{a}_z.$$

In this case, the continuous self-testing of the acceleration sensor during start-up and/or operation can be implemented such that to the accelerations $\vec{a}_1, \vec{a}_2, \vec{a}_3$ and $\vec{a}_4$ obtained as measurement results of the sensor measurement devices are given the multipliers $k_1, k_2, k_3$ and $k_4$ such that $k_1 = -k_3 = k_3 = -k_4$. According to the fundamental idea of the invention, in this way, when the sensor is functioning perfectly, the equation $k_1 \vec{a}_1 + k_2 \vec{a}_2 + k_3 \vec{a}_3 + k_4 \vec{a}_4 = \vec{0}$ is implemented. The equation can also be written in a more clear form $k_1(\vec{a}_1 + \vec{a}_3 - (\vec{a}_2 + \vec{a}_4)) = \vec{0}$.

Further, the continuous self-testing of the acceleration sensor during start-up and/or operation can be implemented such that to the accelerations $\vec{a}_1, \vec{a}_2, \vec{a}_3$ and $\vec{a}_4$ obtained as measurement results of the sensor measurement devices are given the multipliers $k_1, k_2, k_3$ and $k_4$ such that $k_1 = k_3 = 1$ and $k_2 = k_4 = -1$. According to the fundamental idea of the invention, in this way, when the sensor is functioning perfectly, the equation $k_1 \vec{a}_1 + k_2 \vec{a}_2 + k_3 \vec{a}_3 + k_4 \vec{a}_4 = \vec{0}$ is implemented. The equation can also be written in a more clear form $\vec{a}_1 + \vec{a}_3 - (\vec{a}_2 + \vec{a}_4) = \vec{0}$.

In the method according to the invention, the calculation of the vector equations and vector expressions of acceleration is in practise often implemented using scalar values.

In an alternative method according to the invention for the measurement of acceleration directed to two dimensions using a micromechanical acceleration sensor, the measurement directions of the sensor measurement devices measuring in several different directions can, for example, be selected symmetrically such that the accelerations obtained as measurement results of sensor measurement devices measuring in four different directions can be presented as equations:

$$\vec{a}_1 = d \cdot \vec{a}_x$$

$$\vec{a}_2 = d \cdot \vec{a}_y$$

$$\vec{a}_3 = -d \cdot \vec{a}_x$$

$$\vec{a}_4 = -d \cdot \vec{a}_y.$$

In this case, the continuous self-testing of the acceleration sensor during start-up and/or operation can be implemented such that to the accelerations $\vec{a}_1, \vec{a}_2, \vec{a}_3$ and $\vec{a}_4$ obtained as measurement results of the sensor measurement devices are given the multipliers $k_1, k_2, k_3$ and $k_4$ such that $k_1 = k_3$ and $k_2 = k_4$. According to the fundamental idea of the invention, in this way, when the sensor is functioning perfectly, the equation $k_1 \vec{a}_1 + k_2 \vec{a}_2 + k_3 \vec{a}_3 + k_4 \vec{a}_4 = \vec{0}$ is implemented. The equation can also be written in a more clear form $k_1(\vec{a}_1 + \vec{a}_2) + k_2(\vec{a}_3 + \vec{a}_4) = \vec{0}$.

Further, the continuous self-testing of the acceleration sensor during start-up and/or operation can be implemented such that to the accelerations $a_1$, $a_2$, $a_3$ and $a_4$ obtained as measurement results of the sensor measurement devices are given the multipliers $k_1$, $k_2$, $k_3$ and $k_4$ such that $k_1=k_2=k_3=k_4$. According to the fundamental idea of the invention, in this way, when the sensor is functioning perfectly, the equation $k_1 \vec{a}_1 + k_2 \vec{a}_2 + k_3 \vec{a}_3 + k_4 \vec{a}_4 = \vec{0}$ is implemented. The equation can also be written in a more clear form $k_1(\vec{a}_1 + \vec{a}_2 + \vec{a}_3 + \vec{a}_4) = \vec{0}$.

Still further, continuous self-testing of the acceleration sensor during start-up and/or operation can be implemented such that to the accelerations $\vec{a}_1$, $\vec{a}_2$, $\vec{a}_3$, and $\vec{a}_4$ obtained as measurement results of the sensor measurement devices are given the multipliers $k_1$, $k_2$, $k_3$ and $k_4$ such that $k_1 = k_2 = k_3 = k_4 = 1$. According to the fundamental idea of the invention, in this way, when the sensor is functioning perfectly, the equation $k_1 \vec{a}_1 + k_2 \vec{a}_2 + k_3 \vec{a}_3 + k_4 \vec{a}_4 = \vec{0}$ is implemented. The equation can also be written in a more clear form $\vec{a}_1 + \vec{a}_2 + \vec{a}_3 + \vec{a}_4 = \vec{0}$.

Using this invention, an improved method is provided for the measurement of acceleration directed to three or two dimensions using a micromechanical acceleration sensor as well as an improved micromechanical acceleration sensor. Using this invention, the functional reliability of a sensor can be monitored in constant use, and it is suitable for use particularly in small-sized micromechanical acceleration sensor solutions measuring in relation to several axes.

The invention claimed is:

1. A method for the measurement of acceleration, the values of acceleration applied to the sensor being within the sensor measurement range, in the direction of three dimensions using a micromechanical acceleration sensor, which acceleration sensor comprises at least four units of sensor measurement devices measuring in different measurement directions, of which four vectors describing the measurement directions of the sensor measurement devices no three vectors belong to the same plane, wherein in the method, the continuous self-testing of the acceleration sensor during start-up and/or operation is implemented such that to the accelerations $\vec{a}_1$, $\vec{a}_2$, $\vec{a}_3$ and $\vec{a}_4$ obtained as measurement results of the sensor measurement devices are given the multipliers $k_1$, $k_2$, $k_3$ and $k_4$ such that, when the sensor is functioning perfectly, the value of the expression $k_1 \vec{a}_1 + k_2 \vec{a}_2 + k_3 \vec{a}_3 + \ldots + k_n \vec{a}_n$ calculates to $\vec{0}$, the accelerations $\vec{a}_1$, $\vec{a}_2$, $\vec{a}_3$, ... $\vec{a}_n$ given by the sensor measurement devices are measured at given intervals, the value of the expression $k_1 \vec{a}_1 + k_2 \vec{a}_2 + k_3 \vec{a}_3 + \ldots + k_n \vec{a}_n$ is calculated, the value of said expression is compared to a pre-defined threshold value, and if the value of said expression deviates from the value $\vec{0}$ more than said pre-efined threshold value, an error message is given.

2. A method according to claim 1, wherein the measurement directions of the sensor measurement devices measuring in different directions are selected symmetrically such that the accelerations obtained as measurement results of the sensor measurement devices measuring in four different directions can be presented as equations:

$$\vec{a}_1 = c \cdot \vec{a}_x + c \cdot \vec{a}_z$$

$$\vec{a}_2 = c \cdot \vec{a}_y + c \cdot \vec{a}_z$$

$$\vec{a}_3 = -c \cdot \vec{a}_x + c \cdot \vec{a}_z$$

$$\vec{a}_4 = -c \cdot \vec{a}_y + c \cdot \vec{a}_z,$$

and that to the accelerations $\vec{a}_1$, $\vec{a}_2$, $\vec{a}_3$ and $\vec{a}_4$ obtained as measurement results of the sensor measurement devices are given the multipliers $k_1$, $k_2$, $k_3$ and $k_4$ such that $k_1 = k_3 = 1$ and $k_2 = k_4 = -1$.

3. A method according to claim 1, wherein the calculation of said vector expressions is implemented using scalar values.

4. A method according to claim 1, wherein an error message is given when m number of deviations of the value of said expression from the value $\vec{0}$ more than said pre-defined threshold value have occurred.

5. A method according to claim 1, characterized in that said four measurement directions of the sensor measurement device described by said four vectors are selected so that the earth gravitational force has an essential component affecting in each of the said four measurement directions.

6. A micromechanical acceleration sensor for the measurement of acceleration, the values of acceleration applied to the sensor being within the sensor measurement range, in the direction of three dimensions, which acceleration sensor comprises at least four units of sensor measurement devices measuring in different measurement directions, of which four vectors describing the measurement directions of the sensor measurement devices no three vectors belong to the same plane, wherein the acceleration sensor comprises means for implementing continuous self-testing during start-up and/or operation, these means comprising a sensor measurement block, a sensor self-testing block, a sensor comparison block and an alarm block such that the sensor measurement block comprises means for measuring accelerations directed to several different directions at given intervals using the sensor measurement devices, and for giving the values of the accelerations $\vec{a}_1$, $\vec{a}_2$, $\vec{a}_3$, ... $\vec{a}_n$ obtained as measurement results to the sensor self-testing block, the sensor self-testing block comprises means for giving the multipliers $k_1$, $k_2$, $k_3$, ... $k_n$ to the accelerations $\vec{a}_1$, $\vec{a}_2$, $\vec{a}_3$, ... $\vec{a}_n$ obtained as measurement results of the sensor measurement devices such that, when the sensor is functioning perfectly, the value of the expression $k_1 \vec{a}_1 + k_2 \vec{a}_2 + k_3 \vec{a}_3 + \ldots + k_n \vec{a}_n$ calculates to $\vec{0}$, sensor self-testing block further comprises means for calculating the value of the expression $k_1 \vec{a}_1 + k_2 \vec{a}_2 + k_3 \vec{a}_3 + \ldots + k_n \vec{a}_n$ to the accelerations $\vec{a}_1$, $\vec{a}_2$, $\vec{a}_3$, ... $\vec{a}_n$ obtained as measurement results of the sensor measurement devices and measured at given intervals, and means for giving the value of said expression to the sensor comparison block, the sensor comparison block comprises means for comparing the value of said expression $k_1 \vec{a}_1 + k_2 \vec{a}_2 + k_3 \vec{a}_3 + \ldots + k_n \vec{a}_n$ to a given pre-defined threshold value, and the sensor comparison block further comprises means for giving an error message to the alarm block, if the value of said expression deviates from the value $\vec{0}$ more than said pre-defined threshold value.

7. A micromechanical acceleration sensor according to claim 6, wherein the measurement directions of the sensor measurement devices measuring in different directions are selected symmetrically such that the accelerations obtained as measurement results of sensor measuring devices measuring in four different directions can be presented as equations:

$$\vec{a}_1 = c \cdot \vec{a}_x + c \cdot \vec{a}_z$$

$$\vec{a}_2 = c \cdot \vec{a}_y + c \cdot \vec{a}_z$$

$$\vec{a}_3 = -c \cdot \vec{a}_x + c \cdot \vec{a}_z$$

$$\vec{a}_4 = -c \cdot \vec{a}_y + c \cdot \vec{a}_z,$$

and that to the accelerations $\vec{a}_1$, $\vec{a}_2$, $\vec{a}_3$ and $\vec{a}_4$ obtained as measurement results of the sensor measurement devices are given the multipliers $k_1$, $k_2$, $k_3$ and $k_4$ such that $k_1=k_3=1$ and $k_2=k_4=-1$.

8. A micromechanical acceleration sensor according to claim 6, wherein the calculation of said vector expressions is implemented using scalar values.

9. A micromechanical acceleration sensor according to claim 6, wherein an error message is given when m number of deviations of the value of said expression from the value $\vec{0}$ more than said pre-defined threshold value have occurred.

10. A micromechanical acceleration sensor according to claim 6, wherein the sensor comparison block is connected to the sensor self-testing block.

11. A micromechanical acceleration sensor according to claim 6, wherein the sensor measurement block is connected to the sensor self-testing block.

12. A micromechanical acceleration sensor according to claim 6, wherein the sensor alarm block is connected to the sensor comparison block.

13. A micromechanical acceleration sensor according to claim 6, wherein the sensor measurement block is connected to the sensor self-testing block.

14. A micromechanical acceleration sensor according to claim 6, wherein the sensor alarm block is connected to the sensor comparison block.

15. A micromechanical acceleration sensor according to claim 6, characterized in that said four measurement directions of the sensor measurement devices described by said four vectors are selected so that the earth gravitational force has an essential component affecting in each of the said four measurement directions.

* * * * *